3,645,980
VULCANIZATION OF RUBBER
Crispin Stuart Leworthy Baker, Stapleford, Douglas Barnard, Welwyn Garden City, and Maurice Read Porter, Stevenage, England, assignors to The Natural Rubber Producers' Research Association, London, England
No Drawing. Filed Sept. 30, 1969, Ser. No. 862,507
Claims priority, application Great Britain, Oct. 4, 1968, 47,289/68
Int. Cl. C08g 22/08
U.S. Cl. 260—77.5 CR
10 Claims

ABSTRACT OF THE DISCLOSURE

The present invention relates to a novel method of crosslinking natural or synthetic rubbers which comprises reacting rubber with a nitrosophenol or nitrosoamine and reacting pendent amino or hydroxyl groups in the resulting product with a di- or poly-isocyante, so as to cross-link the rubber. Novel synthetic rubber vulcanizates are also provided wherein the crosslinks of said vulcanizates have the general formula:

R—NH—Ar—Y—CO—NH—Q—NH—
　　　　　　　　　　　　　CO—Y—Ar—NH—R wherein R represents a rubber molecule, Ar is an aromatic group, Y is an oxygen atom or a substituted or unsubstituted —NH— group, and Q is an organic di-functional group.

This invention provides a system for cross-linking rubber which makes use of nitrosoanilines or nitrosophenols. The principle of the system is illustrated by the following schematic reaction diagram in which two rubber molecules, R, react with the nitroso groups of two nitrosophenol molecules, and the cross-link is completed by reaction of the pendent hydroxyl groups with a di-isocyanate.

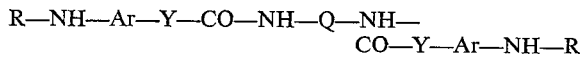

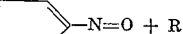

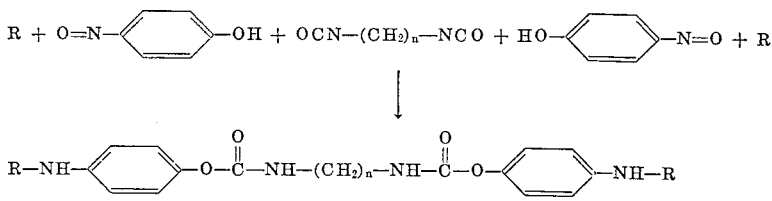

The system of this invention is particularly suitable for use with natural rubber. It is, however, also suitable for use with all natural and synthetic rubbers containing unsaturated carbon-carbon linkages, or other groups capable of reaction with aromatic nitroso groups, in appreciable amounts. The system is not suitable for use with those rubbers which contain very low amounts of unsaturation for vulcanization purposes, for example, ethylene-propylene terpolymers and butyl rubber.

There have been previous proposals for cross-linking butyl rubber by the use of di-nitroso compounds. In the system of this invention, it is believed that the unsaturated rubber molecules react with mono-nitroso compounds to provide reactive pendent groups and that the cross-link is subsequently completed by means of a linking compound.

The invention provides a method of cross-linking a natural or synthetic rubber, which method comprises reacting the rubber with an aromatic nitroso-compound having the formula X—Ar—NO, where X is a hydroxyl or a primary or secondary amino group and Ar is an aromatic group, and reacting the pendent amino or hydroxyl groups in the resulting product with a polyfunctional linking agent so as to cross-link the rubber.

The nitroso-compound is one having a nitroso group, attached to a carbon atom of an aromatic ring, which is capable of adding to an unsaturated rubber molecule, and also having at least one hydroxyl or amine group capable of reacting with the linking compound. One hydrogen atom of the amine group may be replaced, provided that the reactivity of the amine group towards the linking compound is not thereby nullified. Thus, we may use ortho-, meta- or para-nitrosoaniline or ortho-, meta- or para-nitrosophenol. We may also use analogues of these compounds in which the aromatic ring carries one or more inert substituents, such as alkyl or aryl groups, or forms part of a fused aromatic ring system, provided that such substituents are not so large and so positioned as to prevent the functional groups of the nitrosophenol or nitrosoaniline from reacting with the linking compound. The preferred nitroso compounds are para-nitrosoaniline (PNA) and para-nitrosophenol (PNP). PNA is more reactive than PNP and less prone to thermal decomposition but vulcanizing temperatures may be inconveniently low. PNP is less efficient than PNA, but cross-linking temperatures are of the order normally used for sulphur curing.

As a linking compound, we may use di- or poly-isocyanates including aromatic compounds, for example, toluene-2,4-di-isocyanate, and aliphatic compounds, for example, that sold by E. I. Du Pont de Nemours and Co. Inc. under the trademark Hylene W, believed to be 4,4′-di-isocyanato-dicyclohexylmethane. It is within the scope of the invention to use tri- or polyfunctional compounds as the linking compounds.

When the linking compound is a di- (or poly-)isocyanate, the rubber vulcanizates may be represented as having cross-links with the following general formula:

R—NH—Ar—Y—CO—NH—Q—NH—
　　　　　　　　　　　　　CO—Y—Ar—NH—R where R represents a rubber molecule, Ar is an aromatic group, Y is an oxygen atom or a substituted or unsubstituted —NH— group, and Q is an organic di-functional group.

One disadvantage of the use of di-isocyanates is the fact that they react with water with the eventual formation of carbon dioxide. Natural rubber normally contains about half a percent of water, and more may be formed by the nitroso-addition reaction. In order to avoid loss of di-isocyanate and porosity in the vulcanizate, it may be desirable to add to the rubber mix a drying agent of such a nature and in such an amount as to remove the water by reacting chemically with it. Calcium oxide is an example of such a drying agent, and a suspension of calcium oxide in oil sold under the trademark Caloxol is particularly suitable. The use of a drying agent is not a necessity; but it is convenient and cheap and has no attendant disadvantages.

One advantage of the system of this invention lies in the fact that the properties of the vulcanizate may be readily altered by altering the length of the cross-linking chain. Long cross-linking chains can readily be achieved by using higher molecular weight linking compounds, for example, those di-isocyanates sold by E. I. Du Pont de Nemours and Co. Inc. under the trademark Adiprene.

The nitroso compound, or the linking compound, or both, may be formed in situ in the rubber mix, rather than being added per se. The nitroso compound and the linking compound, or their respective precursors, may be added to the rubber mix either together or separately in either order, as is more fully described below. Thorough mixing with the rubber is necessary, and this may conveniently be achieved by milling, for example, in an open mill or an internal mixer. The cross-linking system of this invention may be used either alone, or in conjunction with other systems, e.g., using sulphur, in order to vulcanize the rubber, provided that the other vulcanizing ingredients do not interfere with the nitroso-amine or phenol, or with the linking compound. The nitroso compound and the linking compound may be added to the rubber before, together with, or after such other fillers, additives, or other compounding ingredients as may be determined for the subsequent application of the vulcanizate by the usual practice of the art.

The amount of the nitroso compound and linking compound added to the rubber will depend upon the degree of cure required and can quite readily be determined by methods known in the art. Thus the proportion of aromatic nitroso compound may be from 0.5 to 10, preferably 1 to 5, parts by weight per hundred parts of dry rubber, and the proportion of linking compound may be from 0.5 to 15, preferably 1 to 10, parts by weight per hundred parts of dry rubber. The nitroso compound and the linking compound may be used in equivalent amounts, or either may be used in excess. However, when isocyanates are used as linking compounds, better cross-linking efficiencies may be obtained when excess isocyanate is employed, as the excess may be able to cross-link the cross-links.

A most important advantage of the present invention is that vulcanizates prepared according to it are virtually reversion-resistant. Conditions of cure are therefore not critical, provided always that the temperature of cure is sufficient to form in situ any of the nitroso compound and the linking compound which may not have been added to the rubber as such. Curing conditions may, for example, range from 100° C. to 200° C., for from 6 hours to 10 seconds, e.g., from 1 hour to 10 minutes.

We have further discovered that the cross-linking efficiency of the system may be significantly improved by the addition of certain metal salts of thiols. Examples of such salts include zinc, cadmium and stannous dithiocarbamates, particularly dialkyldithiocarbamates, dithiophosphates, particularly dialkyldithiophosphates, and mercaptobenzothiazoles. It is to be expected that salts of other thiols and thio-acids, in which the (divalent) metal atom is directly bonded to sulphur, will also be effective. Among the salts, the preferred ones are zinc dimethyl-, diethyl- and di-n-butyl-dithiocarbamates on account of their ready availability.

The amount of the metal thio salt used is not critical, and may suitably be from 0.5 to 10, preferably 1 to 6, parts by weight per hundred parts of dry rubber. Generally, 2 parts of the salt are sufficient to give the desired efficiency increase, and there is little to be gained by going above this figure.

According to one aspect of the present invention, the linking compound may be added to a pre-reaction product of the rubber with the nitroso compound. The reaction between natural rubber and PNA or PNP may be effected by heating the two together at a temperature of from 50° C. to 250° C., preferably from 100° C. to 200° C., for suitable reaction times, higher temperatures requiring shorter reaction times. When an internal mixer is used, reaction between the rubber and the nitroso compound may conveniently be effected during mixing. Alternatively the reaction may be effected in latex or in wet coagulum according to the methods described in United States patent application No. 856,828, filed Sept. 10, 1969 of Douglas Bernard et al.

This process suffers, however, from the disadvantage that the linking compound may react too readily with the pendent amine or hydroxyl groups. Thus, when using PNP as the nitroso compound and toluene-2,4-diisocyanate as the linking compound, we have found it difficult to avoid premature vulcanization during milling of the linking compound into the pre-reacted rubber.

It may be possible to mitigate this problem either by keeping the temperature down during the mixing of the linking compound with the pre-reacted rubber (e.g., by using a cooled open mill), or by chemically modifying either the PNP or the di-isocyanate or both so as to reduce the reactivity of the pendent groups towards the linking compound. Nevertheless we prefer to avoid the problem by adding the di-isocyanate in the form of a precursor which decomposes in situ at an elevated temperature to give the linking compound itself. One such compound is the bis phenol adduct of methylene-bis-(4-phenylene-isocyanate), which is commercially available from E. I. Du Pont de Nemours and Co. Inc. under the trademark Hylene MP. When heated to 150° C. or above, this compound dissociates to give methylene-bis-(4-phenylene-isocyanate). Thus we may mill Hylene MP into a mix containing a pre-reaction product of the rubber with PNP, taking care that the temperature does not reach 150° C., and subsequently cure for the required length of time at a temperature of at least 150° C., for example, 30 minutes at 180° C.

According to another and more preferred aspect of the invention, the nitroso compound and the linking compound or a precursor thereof may be milled into the rubber mix together. Under these conditions we find that the premature vulcanization mentioned above is not a problem when PNP or PNA is added to the rubber at the same time as a di-isocyanate.

It is, however, necessary to take steric factors into account when selecting a di-isocyanate. Thus we have found that the cross-linking efficiency obtained when using PNP and Hylene W is much greater than that obtained when using PNP and the more sterically hindered toluene-2,4-di-isocyanate. Better efficiencies still can be obtained by the use of PNA with Hylene W, although the rubber mix cures rapidly at temperatures as low as 120° C. As stated above, the efficiency may be further improved by the addition of a metal thiol salt.

According to another, particularly preferred, aspect of the invention, the pre-reaction product of a nitrosophenol with a di- or poly-isocyanate is added to the rubber, and the resulting mix heated to cross-link the rubber. It is thought that the pre-reaction product is formed by a reaction between the di-isocyanate and the nitrosophenol in its oxime form which may be exemplified as:

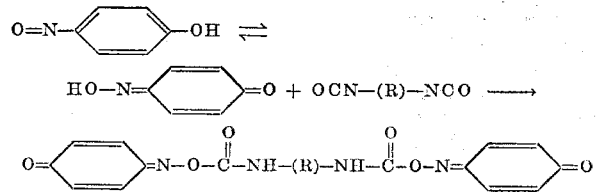

where R is —(cyclo-$C_6H_{10}$)— (cyclo-$C_{16}H_{10}$)—. This is believed to be the formula of Diurethane E, used in Examples 37 to 62 below. The diurethane thus formed is believed to subsequently decompose at an elevated temperature (in the same way as Hylene MP) to give the nitrosophenol and the di-isocyanate which then vulcanize the rubber. We have found that 140° C. to 180° C., dependent on structure, is normally sufficient to decompose the diurethane, and that cure may be conveniently effected by heating the mix for 30 minutes at a temperature in this range.

The use of a pre-reaction product is expected to release the two cross-linking reagents in the rubber mix in stoichiometric amounts. However we find that the use of additional di-isocyanate in conjuncion with the pre-reaction products leads to an increase in cross-linking efficiency. The proportion of diurethane added to the rubber will depend on the degree of cure required, and can quite readily be determined by methods known in the art. Proportions will generally be within the range 1 to 15 preferably from 2 to 10, parts by weight per hundred parts of dry rubber. When an excess of di-isocyanate is used, the proportion will preferably be up to 6 parts by weight per hundred parts of dry rubber. As stated above, the excess di-isocyanate is believed to increase curing efficiency by cross-linking the cross-links. When a particular degree of cure is required, it will generally be possible to use either a large amount of diurethane and a small excess of di-isocyanate, or a smaller amount of diurethane and a larger excess of di-isocyanate. For example, in natural rubber gum vulanizates, approximately the same degree of cure may be achieved using either 4 parts of diurethane with 3 parts excess di-isocyanate, or 6 parts of diurethane with 2 parts excess of di-isocyanate, or 8 parts of diurethane with 1 part excess of di-isocyanate.

It is an important advantage of the use, according to this invention, of diurethane pre-reaction products that rubber vulcanizates prepared therefrom are generally non-staining.

This invention includes within its scope the various processes for cross-linking unsaturated natural or synthetic rubber which are described above and in the examples which follow, and also includes the rubber vulcanizates so produced.

The following examples illustrate the invention. In the examples the following abbreviations are used:

phr.—Parts per hundred parts by weight of dry rubber.
RSS 1—Ribbed smoked sheets Grade 1.
HAF black—High abrasion furnace black.
SRF black—Semi-reinforcing furnace black.
Caloxol C31—Calcium oxide suspension in oil (trademark).
PNP—Para-nitrosophenol.
PNA—Para-nitrosoaniline.
Hylene W—An aliphatic di-isocyanate of NCO content 31.8% by weight (trademark).
Hylene MP—The bis-phenol adduct of methylene-bis-(4-phenylene-isocyanate). (trademark).
TDI—Toluene-2,4-di-isocyanate.
TMDI—2,2,4-trimethyl-hexamethylene-1,6-di-isocyanate.
MR100—Relaxed modulus at 100% extension (BS1673 Pt. 4. Section 4.62 (1953)).
ZDMC—Zinc dimethyldithiocarbamate.

Details and results of Examples 1 to 25 are tabulated in Table 1 below.

EXAMPLES 1 TO 4

Caloxol C31, PNP, and Hylene MP weer added to RSS1 in the normal manner on a cold, open mill. The mix was then press-cured, and the relaxed modulus of the vulcanizate at 100% extension determined. It had previously been determined that the conditions of cure chosen were appropriate to this mix. The addition of the Caloxol to the mix was found to be necessary to eliminate porosity in the vulcanizate.

EXAMPLES 5 AND 6

Caloxol C31, PNP, and TDI were added to RSS1 in the normal manner on a cold, open mill. The efficiency with respect to the di-isocyanate concentration is rather lower than that of Examples 1 to 4.

EXAMPLES 7 TO 10

Caloxol C31, PNP, and Hylene W were added to RSS1 in the normal manner on a cold, open mill. A higher vulcanizing efficiency is obtained than in Examples 5 and 6 and this is believed to be due to the fact that Hylene W is less sterically hindered than TDI.

EXAMPLES 11 TO 18

PNA and Hylene W were added to RSS1 in the normal manner on a cold, open mill. In Examples 11 to 14, 17 and 18, Caloxol C31 was also added with the above reagents. Again, the vulcanizing conditions chosen had previously been shown to be appropriate to these mixes.

The results show a distinct improvement in vulcanization efficiency over that obtained using PNP. It was found that the Caloxol C31 could be omitted without rendering the vulcanizate porous. However, as may be seen by a comparison of Examples 13 and 14 with Examples 15 and 16, omission of the drying agent results in a substantial drop in modulus, presumably because part of the di-isocyanate reacts with the water present.

EXAMPLES 19 TO 22

Caloxol C31, PNA, and Hylene W were added in the normal manner on a cold, open mill to a previously prepared mix of RSS1 and HAF black.

EXAMPLES 23 TO 25

Caloxol C31, PNP and Hylene W were added to RSS1 in the normal manner on a cold, open mill. In Examples 24 and 25 proportions of ZDMC were also included with a substantial improvement in the cross-linking efficiency of the system.

TABLE 1

| Mix No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| Composition (phr.): | | | | | | | | | | | | | | | | | | | | | | | | | |
| RSS1 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 |
| HAF black | 0 | 0 | 0 | 0 | 0 | 0 | 0 | 0 | 0 | 0 | 0 | 0 | 0 | 0 | 0 | 0 | 0 | 0 | 50 | 50 | 50 | 50 | 0 | 0 | 0 |
| PNP | 2.5 | 2.5 | 4 | 4 | 5 | 5 | 2.5 | 2.5 | 5 | 5 | 0 | 0 | 0 | 0 | 0 | 0 | 0 | 0 | 0 | 0 | 0 | 0 | 5 | 5 | 5 |
| PNA | 0 | 0 | 0 | 0 | 0 | 0 | 0 | 0 | 0 | 0 | 1 | 1 | 2 | 2 | 2 | 2 | 3 | 3 | 1 | 1 | 3 | 3 | 0 | 0 | 0 |
| Caloxol C31 | 5 | 5 | 5 | 5 | 5 | 5 | 5 | 5 | 5 | 5 | 5 | 5 | 5 | 5 | 0 | 0 | 5 | 5 | 5 | 5 | 5 | 5 | 5 | 5 | 5 |
| TDI | 0 | 0 | 0 | 0 | 1 | 5 | 0 | 0 | 0 | 0 | 0 | 0 | 0 | 0 | 0 | 0 | 0 | 0 | 0 | 0 | 0 | 0 | 0 | 0 | 0 |
| Hylene MP | 7.5 | 10 | 7 | 10 | 0 | 0 | 0 | 0 | 0 | 0 | 0 | 0 | 0 | 0 | 0 | 0 | 0 | 0 | 0 | 0 | 0 | 0 | 0 | 0 | 0 |
| Hylene W | 0 | 0 | 0 | 0 | 0 | 0 | 1.3 | 2.6 | 2.6 | 9.1 | 0 | 1 | 2.5 | 1 | 4 | 1 | 4 | 2.5 | 6 | 1 | 2 | 1 | 6 | 6.5 | 6.5 |
| ZDMC | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 2 | 12 |
| Cure time (min.) | 30 | 30 | 30 | 30 | 30 | 30 | 30 | 30 | 30 | 30 | 20 | 20 | 20 | 20 | 20 | 20 | 20 | 20 | 20 | 20 | 20 | 20 | 40 | 40 | 40 |
| Temp. (° C.) | 180 | 180 | 180 | 180 | 180 | 180 | 180 | 180 | 180 | 180 | 120 | 120 | 120 | 120 | 120 | 120 | 120 | 120 | 120 | 120 | 120 | 120 | 140 | 140 | 140 |
| MR100 (kg./cm.²) | 4.7 | 5.6 | 5.1 | 6.0 | 3.8 | 5.3 | 3.4 | 4.2 | 5.0 | 8.0 | 5.2 | 5.8 | 6.3 | 8.7 | 4.3 | 6.4 | 8.0 | 11.4 | 15.1 | 17.7 | 24.0 | 40.5 | 6.9 | 11.5 | 11.0 |

EXAMPLES 26 TO 33

PNP was caused to react with TDI in toluene solution by heating for 10 minutes at 70° C. to give a product designated Diurethane A (M.P. 178–180° C.).

Similarly, PNP was caused to react respectively with hexamethylene - 1,6-di-isocyanate, with 2,2,4-trimethyl-hexamethylene-1,6-di-isocyanate, and with toluene-2,4-di-isocyanate, in toluene solution by heating for 10 minutes at 100° C. to give products designated respectively Diurethanes B, C and D.

Samples of Diurethane A, B, C or D were added with Caloxol C31 to RSS1 in the normal manner on a cold, open mill. In Examples 28 to 33, additional isocyanate was included (not necessarily, it should be noted, the diisocyanate from which the diurethane had been prepared). In Examples 29, 31 and 33, ZDMC was also added. The mixes were press-cured under appropriate conditions, and the MR100 values of the vulcanizates are given in Table 2.

TABLE 2

| Mix No. | 26 | 27 | 28 | 29 | 30 | 31 | 32 | 33 |
|---|---|---|---|---|---|---|---|---|
| Composition (phr.): | | | | | | | | |
| RSS1 | 100 | 100 | 100 | 100 | 100 | 100 | 100 | 100 |
| Caloxol C31 | 5 | 5 | 5 | 5 | 5 | 5 | 5 | 5 |
| Diurethane A | 4 | 10 | 0 | 0 | 0 | 0 | 0 | 0 |
| Diurethane B | 0 | 0 | 3.25 | 3.25 | 0 | 0 | 0 | 0 |
| Diurethane C | 0 | 0 | 0 | 0 | 3.6 | 3.6 | 0 | 0 |
| Diurethane D | 0 | 0 | 0 | 0 | 0 | 0 | 3.35 | 3.35 |
| Hylene W | 0 | 0 | 3 | 3 | 0 | 0 | 0 | 0 |
| TMDI | 0 | 0 | 0 | 0 | 2.4 | 2.4 | 0 | 0 |
| TDI | 0 | 0 | 0 | 0 | 0 | 0 | 2.0 | 2.0 |
| ZDMC | 0 | 0 | 0 | 2 | 0 | 2 | 0 | 2 |
| Cure time (min.) | 30 | 30 | 30 | 30 | 30 | 30 | 30 | 30 |
| Temperature (° C.) | 180 | 180 | 150 | 150 | 150 | 150 | 150 | 150 |
| MR100 (kg./cm.$^2$) | 3.4 | 4.7 | 3.4 | 4.9 | 3.2 | 3.8 | 3.4 | 5.2 |

EXAMPLES 34 TO 36

Caloxol C31, PNA, and Hylene W were added to three synthetic rubbers in the normal manner on a cold, open mill. The synthetic rubbers used were a stereoregular polybutadiene (Phillips Cis-4), a styrene-butadiene copolymer (Intol 1500) and a polychloroprene (Neoprene WRT). The data given in Table 3 below that these three rubbers were vulcanized as readily as natural rubber using this system.

TABLE 3

| Mix No. | 34 | 35 | 36 |
|---|---|---|---|
| Composition (phr.): | | | |
| Cis-4 | 100 | 0 | 0 |
| Intol 1500 | 0 | 100 | 0 |
| Neoprene WRT | 0 | 0 | 100 |
| Caloxol C31 | 5 | 5 | 5 |
| PNA | 2 | 2 | 2 |
| Hylene W | 4 | 2.5 | 3 |
| Cure time (min.) | 20 | 30 | 30 |
| Temperature (° C.) | 120 | 120 | 120 |
| MR100 (kg./cm.$^2$) | 9.1 | 5.7 | 4.3 |

EXAMPLES 37 TO 57

PNP was caused to react with Hylene W in toluene solution by heating for 10 minutes at 100° C. to give a product designated Diurethane E. (M.P. 158° C.).

Natural rubber gum vulcanizate formulations were prepared by mixing together 100 parts of RSS1, 5 phr. of Caloxol C31 and various proportions of Diurethane E, Hylene W and ZDMC in the normal manner at about 70° C. on a cold, open mill. The mixes were cured under appropriate conditions (30 minutes at 140° C. for Examples 37 to 41, and 60 minutes at 140° C. for Examples 42 to 57). The relaxed modulus at 100% extension of the vulcanizates is reported in Table 4.

EXAMPLES 58 TO 62

Further samples of Diurethane E were used to prepare natural rubber filled vulcanizate compositions. The Diurethane E was mixed in the usual way with RSS1, SRF black, Caloxol C31, and in certain cases with Hylene W, ZDMC and a compounding oil (Petrofina 2069), at about 70° C. on a cold, open mill. The mixes were cured under appropriate conditions (30 minutes at 140° C. for Examples 58 and 59, and 60 minutes at 140° C. for Examples 60 to 62). The relaxed modulus at 100° extension of the vulcanizates is reported in Table 5.

TABLE 5

| Example | 58 | 59 | 60 | 61 | 62 |
|---|---|---|---|---|---|
| Composition (phr.): | | | | | |
| RSS1 | 100 | 100 | 100 | 100 | 100 |
| SRF black | 50 | 50 | 50 | 50 | 50 |
| Caloxol C31 | 5 | 5 | 5 | 5 | 5 |
| Diurethan E | 10 | 10 | 8 | 6 | 4 |
| ZDMC | 0 | 0 | 2 | 2 | 2 |
| Hylene W | 0 | 4 | 1 | 2 | 3 |
| Oil (Petrofina 2069) | 5 | 5 | 0 | 0 | 0 |
| MR100 (kg./cm.$^2$) | 9.9 | 23.3 | 20.3 | 21.6 | 20.8 |

The vulcanizates prepared according to the previous examples generally have excellent ageing properties. This is demonstrated in Table 6 below in respect of the vulcanizates of Examples 46, 51, 53 and 60.

TABLE 6

| Example | 46 | 51 | 53 | 60 |
|---|---|---|---|---|
| Properties: | | | | |
| Initial tensile strength (kg./cm.$^2$) | 180 | 206 | 212 | 198 |
| Percent tensile strength retained after air oven ageing at 100° C.: | | | | |
| For 7 days | 37 | 35 | 47 | 46 |
| For 14 days | 16 | 17 | 28 | 39 |
| Initial elongation at break (percent) | 560 | 595 | 760 | 380 |
| Percent initial elongation at break retained after air oven ageing at 100° C.: | | | | |
| For 7 days | 62 | 68 | 79 | 52 |
| For 14 days | 38 | 47 | 70 | 47 |
| Modulus M100 at 100% extension (kg./cm.$^2$) | 10.0 | 8.5 | 7.0 | 29.0 |
| Percent M100 retained after air oven ageing at 100° C.: | | | | |
| For 7 days | 110 | 85 | 77 | 102 |
| For 14 days | 115 | 90 | 54 | 103 |

EXAMPLES 63 TO 71

The effectiveness of ZDMC in increasing cross-link efficiency has been demonstrated above. Table 7 below shows that other zinc, cadmium and stannous salts of other thiols have a similar effect. The compounds reported were added in the usual way on a cold open mill to RSS1, together with 5 phr. of Caloxol C31, 4 phr. of Diurethane E and 3 phr. of Hylene W. Proportions of the salts were chosen to be equivalent to 2 phr. of ZDMC. The mixes were vulcanized for 60 minutes at 140° C. The experiments were performed in two batches, with the control MR100 figure being, as expected, rather different in the two cases.

TABLE 7

| Example | Additive | MR100 (kg./cm.$^2$) |
|---|---|---|
| Control | None | 3.8 |
| 63 | ZDMC | 7.8 |
| 64 | Zinc diethyldithiocarbamate | 8.2 |
| 65 | Zinc dibutyldithiocarbamate | 8.1 |
| 66 | Zinc dinonyldithiocarbamate | 7.0 |
| 67 | Cadmium di-isopropyldithiocarbamate | 6.9 |
| 68 | Cadmium dinonyldithiocarbamate | 6.4 |
| Control | None | 3.5 |
| 69 | Zinc mercaptobenzothiazole | 4.9 |
| 70 | Cadmium di-isopropyldithiophosphate | 6.5 |
| 71 | Stannous di-isopropyldithiophosphate | 4.9 |

TABLE 4

| Example | 37 | 38 | 39 | 40 | 41 | 42 | 43 | 44 | 45 | 46 | 47 | 48 | 49 | 50 | 51 | 52 | 53 | 54 | 55 | 56 | 57 |
|---|---|---|---|---|---|---|---|---|---|---|---|---|---|---|---|---|---|---|---|---|---|
| Composition (phr.): | | | | | | | | | | | | | | | | | | | | | |
| RSS1 | 100 | 100 | 100 | 100 | 100 | 100 | 100 | 100 | 100 | 100 | 100 | 100 | 100 | 100 | 100 | 100 | 100 | 100 | 100 | 100 | 100 |
| Caloxol C31 | 5 | 5 | 5 | 5 | 5 | 5 | 5 | 5 | 5 | 5 | 5 | 5 | 5 | 5 | 5 | 5 | 5 | 5 | 5 | 5 | 5 |
| Diuretane E | 5 | 5 | 10 | 10 | 10 | 10 | 10 | 8 | 8 | 8 | 8 | 8 | 6 | 6 | 4 | 4 | 4 | 4 | 3 | 2 | 2 |
| ZDMC | 0 | 0 | 0 | 0 | 0 | 2 | 2 | 6 | 5 | 4 | 3 | 2 | 1 | 0 | 4 | 2 | 2 | 2 | 2 | 2 | 2 |
| Hylene W | 0 | 1 | 0 | 1 | 5 | 0 | 3 | 1 | 1 | 1 | 1 | 1 | 2 | 2 | 1 | 3 | 3 | 5 | 3 | 3 | 3 |
| MR100 (kg./cm.$^2$) | 3.4 | 5.0 | 3.9 | 6.8 | 10.7 | 7.9 | 12.2 | 8.9 | 9.1 | 9.1 | 8.6 | 8.3 | 8.3 | 5.1 | 8.4 | 8.3 | 5.4 | 7.9 | 9.0 | 7.7 | 6.5 |

We claim:
1. A method of cross-linking a natural or synthetic rubber containing unsaturated carbon-carbon linkages, which method comprises:
 reacting the rubber with from 0.5 to 10 parts by weight per 100 parts of dry rubber of an aromatic nitroso compound having the formula X—Ar—NO, wherein X is a hydroxyl or a primary or secondary amino group, and Ar is an aromatic group;

and reacting the pendent hydroxyl or amino group in the resulting product with from 0.5 to 15 parts by weight per 100 parts of dry rubber of a polyfunctional linking compound selected from di- and poly-isocyanates, so as to cross-link the rubber.

2. A method as claimed in claim 1, wherein the aromatic nitroso compound is para-nitrosophenol or para-nitrosoaniline.

3. A method as claimed in claim 1, wherein the polyfunctional linking compound is an organic di-isocyanate.

4. A method as claimed in claim 1, wherein from 0.5 to 10 parts by weight per 100 parts of dry rubber of a zinc, cadmium or stannous dithiocarbamate, dithiophosphate or mercaptobenzothiazole are included in the rubber mix.

5. A method as claimed in claim 1, wherein the aromatic nitroso compound is a nitrosophenol, which with the di- or poly-isocyanate is included in the rubber mix in the form a di- or poly-urethane pre-reaction product in an amount of from 1 to 15 parts by weight per 100 parts of dry rubber.

6. A method as claimed in claim 5, wherein the diurethane prereaction product is the reaction product of para-nitrosophenol in its oxime form with 4,4′-di-isocyanate-dicyclohexylmethane.

7. A method as claimed in claim 3, wherein calcium oxide is included in the rubber mix in an amount to remove any water present.

8. A method of cross-linking natural rubber, which method comprises the steps of:
forming a pre-reaction product by reacting para-nitrosophenol in its oxime form with an organic di-isocyanate to give a diurethane;
milling together on a cold open mill the rubber, from 2 to 10 parts by weight per 100 parts of dry rubber of the diurethane pre-reaction product, up to 6 parts by weight per 100 parts of dry rubber of an organic di-isocyanate, from 1 to 6 parts by weight per 100 parts of dry rubber of zinc dimethyldithiocarbate, and sufficient calcium oxide to react with any water present;
and curing the rubber mix by heating it at a temperature of from about 140° C. to about 180° C.

9. A method of cross-linking a natural or synthetic rubber containing unsaturated carbon-carbon linkages, which method comprises adding to the rubber from 1 to 15 parts by weight per 100 parts of dry rubber of a pre-reaction product of a nitrosophenol, having the formula HO—Ar—NO where Ar is an aromatic group, with a di- or poly-isocyanate, and heating the mixture to a temperature and for a time to cross-link the rubber.

10. A vulcanizate of natural or synthetic rubber containing unsaturated carbon-carbon linkages characterized in that the cross-links have the general formula R—NH—Ar—Y—CO—NH—Q
—NH—CO—Y—Ar—NH—R wherein R represents a rubber molecule, Ar is an aromatic group, Y is an oxygen atom or a substituted or unsubstituted —NH— group, and Q is an organic difunctional group.

References Cited
UNITED STATES PATENTS 2,381,063   8/1945   Kung _____ 260—83

DONALD E. CZAJA, Primary Examiner

M. J. WELSH, Assistant Examiner

U.S. Cl. X.R.

260—85.1, 92.3, 94.7 A, 768